May 8, 1956 R. STEVENSON 2,744,538
HYDRAULIC PRESSURE RELIEF VALVE
Filed May 17, 1952 2 Sheets-Sheet 1

INVENTOR.
ROBERT STEVENSON
BY
William Frederick Werner
ATTORNEY

May 8, 1956  R. STEVENSON  2,744,538
HYDRAULIC PRESSURE RELIEF VALVE
Filed May 17, 1952  2 Sheets-Sheet 2

INVENTOR.
ROBERT STEVENSON
BY
William Frederick Werner
ATTORNEY

United States Patent Office 2,744,538
Patented May 8, 1956

2,744,538

HYDRAULIC PRESSURE RELIEF VALVE

Robert Stevenson, Barrington, R. I., assignor to Anco, Inc., a corporation of Rhode Island Application May 17, 1952, Serial No. 288,461

2 Claims. (Cl. 137—490)

This invention relates to a hydraulic pressure relief valve such as may be used to control the storing of fluid at a predetermined pressure in a reservoir or the like for operating some work unit.

This invention is an improvement over my co-pending application Serial Number 244,312 filed August 30, 1951 and differs from that invention in that the valve plugs are controlled in a manner different from that shown and described in said co-pending application.

One of the objects of the present invention is to provide a pressure relief valve which will function within two percent of the opening pressure and three percent of the closing pressure, depending upon the viscosity of the hydraulic fluid.

Another object of the present invention is to provide a hydraulic pressure relief valve in which fluttering of the port controls is completely eliminated at any pressure change.

And still another object of the present invention is to provide a hydraulic pressure relief valve with controls which permit substantially the same volume of fluid, at the same rate of flow to pass through the outlet port as enters the inlet port.

With these and other objects in view, the invention consists of certain novel features of construction which will be more fully described and particularly pointed out in the appended claims.

The nub of the present invention lies in the concept of the area relationship of the control port to the power of the spring controlling the primary valve. It is the flow control of the fluid which cannot pass through the control port acting against the primary valve spring which controls the operation of the secondary valve. This unique construction provides a relief valve of great sensitivity with a new smoothness of function and a new high in efficiency.

Like reference numerals refer to like parts in the accompanying drawings in which.

Figure 1:
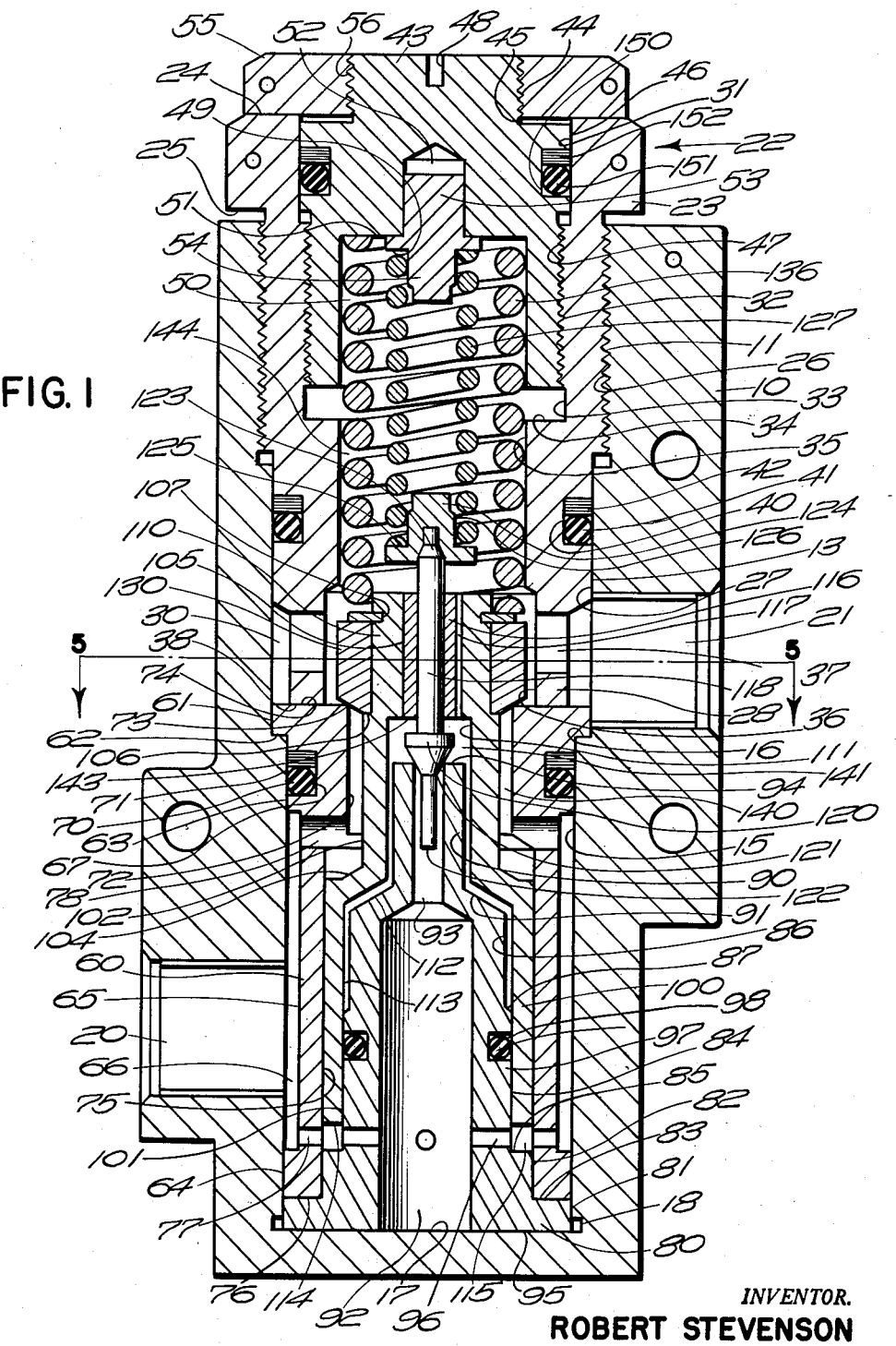
Figure 1 is a longitudinal sectional view taken along line 1—1 of Figure 3 looking in the direction of the arrows.
Figure 2:
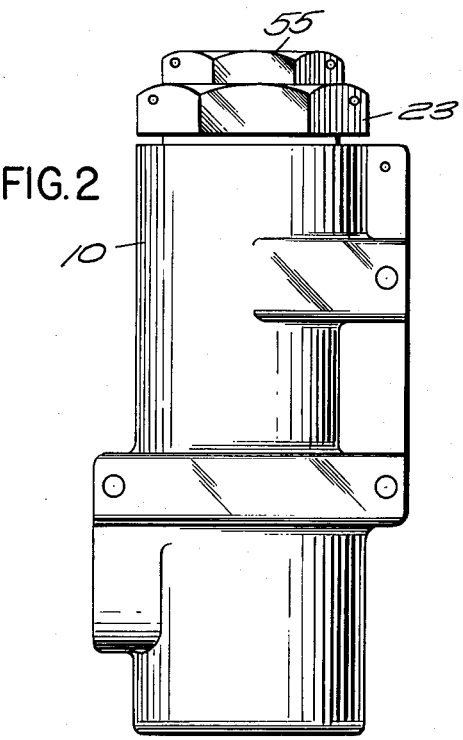
Figure 2 is a front elevational view of the new hydraulic pressure relief valve.
Figure 3:
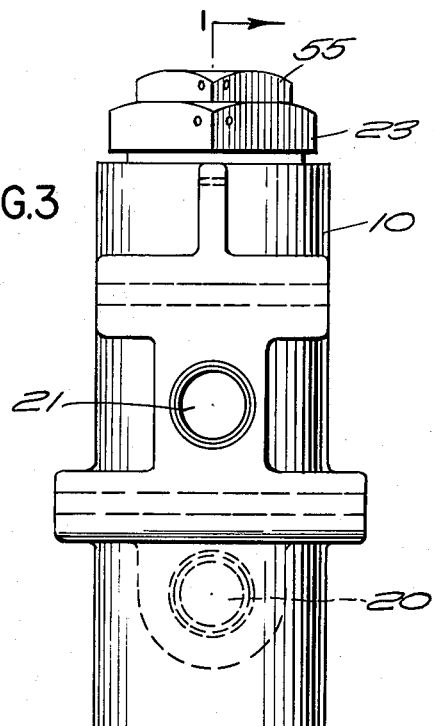
Figure 3 is a side elevational view of the same.
Figure 4:
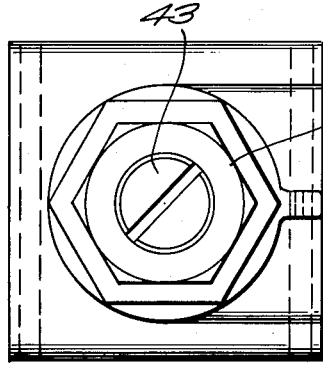
Figure 4 is a top plan view of the same.
Figure 5:
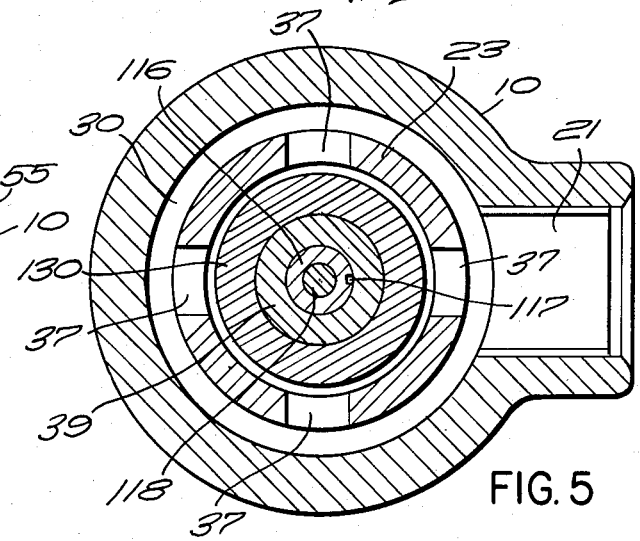
Figure 5 is a lateral sectional view taken along line 5—5 of Figure 1.

Referring to the drawings, reference character 10, designates the housing having a cylindrical core comprised of the following areas. A threaded area 11 in the upper end is separated from a gland seat 13 by a recess 14. An insert contact area 15 forms a ledge 16 with gland seat 13 and is separated from base 17 by means of a recess 18.

Housing 10 is provided with an inlet 20 and outlet 21 which communicate with the cylindrical core an insert contact area 15 and gland seat 13 respectively.

A gland generally indicated by reference character 22 is provided with a head 23 having a top surface 24 and a bottom surface 25. A threaded area 26, extending from bottom surface 25, is adapted to engage threaded area 11. A gland seat 27 adjacent threaded area 26 terminates in a cut back face 28 which forms a chamber 29 with gland seat 13.

Internally, gland 22 is provided with a bearing 31, adjacent a threaded area 32 which terminates in a relief ring 33 which forms a ledge 34 with bore 35 which ends in a cut back 36 having a series of ports 37 shown as consisting of four in number. It is the combined area of the ports which determines their size and number. In turn the volume and rate of discharge determine the port areas. Gland 22 is provided with base 38 and a groove 40 in gland seat 27 adapted to house a fluid tight packing illustrated as consisting of a neoprene O ring 41 backed up by a leather washer 42 which is provided when the fluid passing through the valve is under high pressure from three thousand to ten thousand pounds per square inch. O ring 41 and leather washer 42 form a fluid tight seal with gland seat 27.

An adjustable retaining nut 43 provided with a thread 44, a recess 45 at the base of thread 44, a shoulder 46, and a threaded shank 47 adapted to engage threaded area 32 has a screw slot 48 in its head. A groove 150 in shoulder 46 houses a fluid tight packing illustrated as a neoprene O ring 151 backed up by a leather washer 152 which co-act with bearing 31.

Internally, adjustable retaining nut 43 is provided with a central bore 50 terminating in a base 51 having an opening 52 therein.

A shoulder stud 53 is secured in opening 52 with its shoulder contacting base 51 and a shank 54 extending outwardly, therefrom, forming a spring seat 49.

A cap nut 55 provided with threads 56 adapted to engage threads 44 bears against top surface 24.

A tubular insert 60 provided on its outside diameter with a bearing 61 adapted to engage gland seat 27 has a set back 62 adapted to engage ledge 16 and bearings 63 and 64 adapted to engage insert contact area 15 are separated by recess diameter 65 which forms a chamber 66 with insert contact area 15. Bearing 63 is provided with a groove 67 adapted to house a fluid tight packing when cooperating with insert contact area 15. The fluid tight packing is illustrated as consisting of a neoprene O ring 70 backed up by a leather washer 71 for reasons of high pressure as previously described.

Internally, tubular insert 60 comprises a collar 72 which forms a valve seat 73 at the junction of top 74. Collar 72 terminates in a lifting sleeve bearing 75. Tubular insert 60 has a base 76 and two series of ports 77 and 78 shown as consisting of four ports to a series but the number and area of each series of ports may be increased or decreased depending on the working conditions of pressure and volume.

Lining 80, tubular in composition consists externally of a series of steps comprises housing diameter 81 separated from tubular insert diameter 82 by tubular insert seat 83 and from lifting sleeve bearing 84 by port edge 85. Diameter 86 is separated from lifting sleeve bearing 84 by step 87. Small diameter 90 is separated from diameter 86 by means of a beveled edge 91.

Internally, lining 80 consists of a chamber 92 having a passageway 93. Lining 80 has an upper surface 94 and a base 95. A series of ports 96 are provided above port edge 85. As previously stated the number and area of the ports is determined by the rate and volume of flow of the hydraulic fluid. Lifting sleeve bearing 84 is provided with a groove 97 adapted to house a fluid tight packing illustrated as consisting of a neoprene O ring 98. Upper surface 94 forms a valve seat 89 at the juncture of passageway 93.

A lifting sleeve or piston 100, tubular in composition consists externally of a bearing 101 on its largest diameter adjacent an intermediate diameter 102 with a ledge 104 formed between them. A neck 105 adjacent intermediate diameter 102 is smaller in diameter than intermediate diameter 102, consequently a ledge 106 is formed between them. A recess 107 is provided in neck 105 for reasons presently to be described. Bearing 101 and lifting sleeve bearing 75 are united with a sliding fit.

Internally, lifting sleeve 100 is provided with a bushing seat 110 followed by an internal diameter 111 which terminates in a beveled face 112 adjacent a bearing surface 113 which cooperates with O ring 98 to form a fluid tight seal. The end 114 cooperating with port edge 85 allows a port 115 to be formed between them.

A bushing 116 provided with a port 117 is secured in bushing seat 110. A poppet valve having a shank 118 is slidably mounted in bushing 116 and is provided with a valve head 120, valve seat 121 and a tongue 122. Shank 118 is tapered as at 123 so that it can form a drive fit in spring retainer 124 and be secured thereby. Spring retainer 124 is provided with a spring seat 125 and a shank 126. A coil spring 127 is interposed between spring seat 125 and spring seat 49.

A valve 130 has a drive fit contact with neck 105. End 131 of valve 130 rests against ledge 106. Valve seat 132 contacts valve seat 73. A retaining ring 133 housed in recess 107 locks valve 130 in position on neck 105. A coil spring 136 has its lower coil in engagement with the top of neck 105 and its uppermost coil bearing against base 51.

In operation the new and improved hydraulic pressure relief valve functions as follows: Fluid under pressure will enter inlet 20 and circulate in chamber 66 which has two outlets, ports 77 and 78. The fluid flowing through ports 78 will enter chamber 140 formed between collar 72 and intermediate diameter 102. Valve 130 with its seat 132 engaging valve seat 73 under the influence of spring 136 will prevent the fluid from leaving chamber 140.

The fluid entering ports 77 will pass through port 115 and ports 96 into chamber 92 and passageway 93 to act against valve seat 121 engaging valve seat 89. Spring 127 controls the relationship of valve seat 121 to valve seat 89.

Let it be assumed that six gallons per minute of fluid at three thousand pounds per square inch is circulating in the system in which the present invention is a component part. Spring 127 acting on valve seat 121 will function at two per cent of opening and three per cent of closing. That is, when the fluid pressure in passageway 93 reaches two thousand nine hundred and forty pounds per square inch valve seat 121 will start to lift away from valve seat 89, permitting the fluid in passageway 93 to flow into chamber 141 formed by internal diameter 111. When the fluid pressure in passageway 93 drops to two thousand nine hundred and ten pounds per square inch valve seat 121 will engage valve seat 89 thereby sealing the fluid in passageway 93. The present construction contemplates a pressure range from five hundred pounds per square inch to ten thousand pounds per square inch with a slight increase of a volume of six gallons per minute with the increased pressure over three thousand pounds per square inch.

Fluid passing into chamber 141 past valve seat 121 and valve seat 89 will flow downwardly between lifting sleeve 100 and lining 80. Neoprene O ring 98 will prevent fluid from passing that fluid tight seal. The fluid in chamber 141 will start to escape through port 117 but as the pressure builds up it will act on beveled face 112 and the base 143 of bushing 117, thereby raising lifting sleeve 100 and valve seat 132 away from valve seat 73. The fluid will flow into bore 35 and central bore 50 where it will be captured, hence it will flow through ports 37 into chamber 30 and through outlet 21. Neoprene O rings 41 and 151 with their companion back up leather washers 42 and 152 provide a leak proof construction.

The fluid passing through port 117 passes into bore 35 and central bore 50, ports 37 into chamber 30 and through outlet 21.

One of the features of the present invention is the construction of the housing 10, gland 22, retaining nut 43 and cap nut 55 all the largest and normally heaviest pieces of a valve, fabricated from aluminum while the working parts of the valve are fabricated from high grade steel. The coefficient of expansion of the different metals presents the challenging problem of forming a fluid tight seal which will withstand the high pressures the valve will be subjected to. The present construction solves that problem resulting in a valve especially adaptable to air craft because of its light weight.

Having shown and described one embodiment of the present invention, by way of example, but realizing that structural changes can be made and other examples given without departing from either the spirit or the scope of this invention.

What I claim is:

1. A hydraulic pressure relief valve comprising a housing having a cylindrical core, an inlet and an outlet in communication with said cylindrical core, an insert contact area and a gland seat formed in said cylindrical core, a gland provided with a gland seat secured in said cylindrical core with its gland seat engaging the gland seat in said cylindrical core and means between said gland seats to form a fluid tight seal, a bore provided in said gland, a cut back in said gland forming a chamber with said cylindrical core, ports in said gland connecting said chamber with said bore, said chamber in communication with said outlet, a retaining nut adjustably secured in said bore, a cap nut secured to said retaining nut and engageable with said gland, a central bore provided in said retaining nut in communication with said bore in said gland, means provided between said retaining nut and said gland to provide a fluid tight seal, a tubular insert held in position in said cylindrical core by means of said gland, said tubular insert provided with means to form a fluid tight seal with said insert contact area in said cylindrical core, a recess diameter in said tubular insert forming a chamber with said insert contact area, said inlet in communication with said last named chamber, ports in said tubular insert at the upper end and at the lower end of said recess diameter, a valve seat formed in the upper internal diameter of said tubular insert, a lifting sleeve slidably mounted in said tubular insert, a valve secured on said lifting sleeve engageable with said valve seat in said tubular insert, resilient means located in said bore of said gland and said central bore of said retaining nut engaging said valve and said retaining nut, said lifting sleeve forming a chamber with said tubular insert, said chamber connecting said ports in the upper end of said recess diameter with the bore in said gland, a poppet valve slidably mounted in said lifting sleeve, resilient means located in said bore of said gland and said central bore of said retaining nut engaging said poppet valve and said retaining nut, a lining located in said cylindrical core and provided with means to form a fluid tight seal with said lifting sleeve, a step formed in said lining forming a chamber between said lifting sleeve and said lining, a chamber terminating in a passageway formed in said lining, a valve seat formed in said passageway engageably by said poppet valve, ports in said lining connecting said last named chamber with the ports in the lower end of said recess diameter and a port in said lifting sleeve connecting said chamber formed between said lifting sleeve and said lining with the bore in said gland.

2. In a relief valve for a fluid system, a housing having a cylindrical core provided with an inlet port and an outlet port, a gland secured in said cylindrical core in fluid tight relationship and having a bore and a cut back face having a port connecting said bore with said outlet port, an adjustable nut positioned in said bore in fluid tight relationship, a tubular insert provided with a recessed diameter and an internal collar provided with a first valve seat located in said cylindrical core in fluid tight relationship beneath the bottom of said gland and forming a first chamber between said recess diameter and said cylindrical core, ports in said tubular insert providing a fluid passageway through said tubular insert, a tubular lining having an inside and an outside diameter provided with a first beveled edge on its outside diameter and a second valve seat in the top of its inside diameter, ports in said tubular lining providing a fluid passageway through said tubular lining and located in said cylindrical core, a tubular lifting sleeve provided with a conduit and a second beveled edge approximately midway of its length and having a first valve formed in one end, and located in said cylindrical core between said tubular insert and said tubular lining, forming a fluid tight relationship with said tubular insert below said beveled edge and providing a port formed between the bottom of said tubular lifting sleeve and said lining, said second beveled edge being aligned opposite said first beveled edge with a second chamber formed between said tubular lifting sleeve and said lining above said means which provides a fluid tight relationship, said conduit connecting said second chamber with said bore, said tubular lifting sleeve forming a third chamber with said tubular insert, said first valve engaging and disengaging said valve seat to open and close said third chamber, a spring located in said bore abutting said adjustable nut and said tubular lifting sleeve, a second valve slidably mounted in said tubular lifting sleeve engaging and disengaging said second valve seat, a second spring located in said bore abutting said adjustable nut and said second valve, said second valve being exposed in the fluid pressure at said tubular lining whereby to be moved from its seat upon a predetermined pressure being present thereat and to permit the fluid under pressure to enter said second chamber and move said lifting sleeve through action on said second beveled edge to actuate said first valve to provide a passageway from said inlet port to said outlet port.

References Cited in the file of this patent
UNITED STATES PATENTS

| | | |
|---|---|---|
| 2,279,571 | Kane | Apr. 14, 1942 |
| 2,375,410 | Condek | May 8, 1945 |
| 2,520,893 | Stevenson | Aug. 29, 1950 |
| 2,555,334 | Green | June 5, 1951 |
| 2,655,174 | Towler | Oct. 13, 1953 |

FOREIGN PATENTS

| | | |
|---|---|---|
| 455,910 | Italy | Mar. 18, 1950 |